United States Patent Office 3,267,518
Patented August 23, 1966

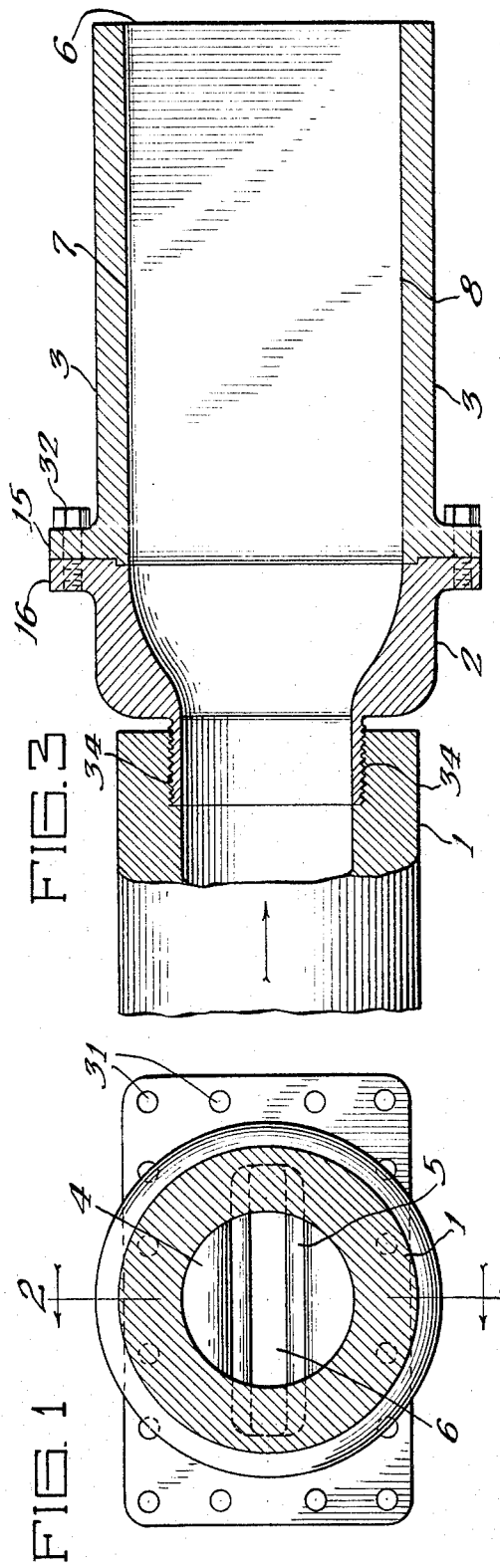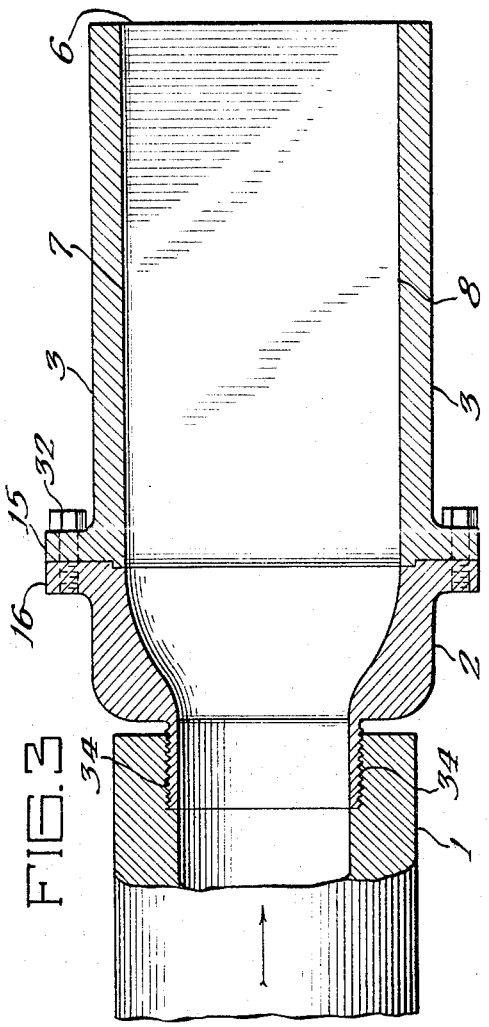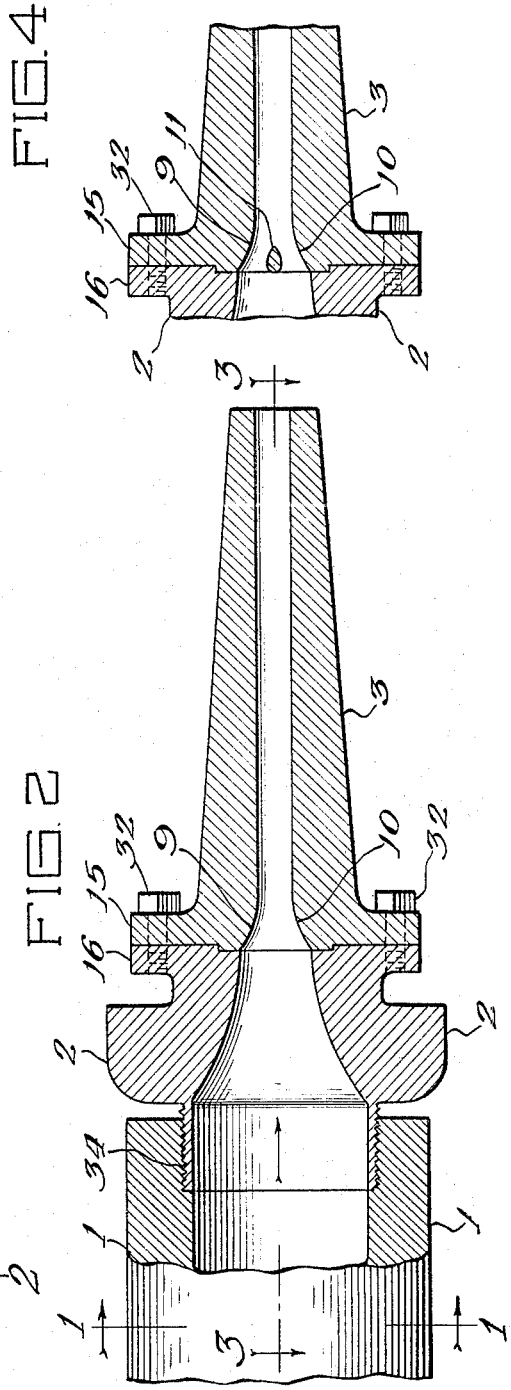

3,267,518
APPARATUS FOR MAKING CARBON ELECTRODES OR NEUTRONIC REACTOR CORE BARS
Leslie H. Juel and Bruce L. Bailey, Lewiston, N.Y., assignors to Great Lakes Carbon Corporation, New York, N.Y., a corporation of Delaware
Original application Feb. 9, 1961, Ser. No. 88,064. Divided and this application Dec. 27, 1963, Ser. No. 337,970
9 Claims. (Cl. 18—12)

This invention relates primarily to the production of a special type of carbonaceous electrode or core material bar for atomic reactors, said bars, when graphitized, and properly placed in a neutronic reactor core providing a maximum stability and minimum susceptibility to high temperature radiation damage. The invention is particularly related to special apparatus adapted for making such core material bars. The present application is a division of our co-pending application, Serial Number 88,064, filed February 9, 1961.

The rods or bars being referred to, which will generally be substantially rectangular in cross section, are used to perform the function of rods or blocks such as those shown and depicted by the number 77 in FIGURE 22 of the Fermi et al. Patent 2,708,656.

In the design of the reactors of this patent, and of similar reactors, the problem is encountered wherein excessive shrinkage vertically across a series of blocks 77 resulting from high temperature radiation damage, causes a downward slumping of the whole reactor core assembly thereby preventing certain mechanical operations essential to the proper functioning of the reactor and necessitating relatively frequent reconstruction or repair thereof. Radiation effects or damage horizontally across a series of blocks 77, or along the length of blocks 77, do not occasion as serious problems. Thus, it is advantageous if the blocks 77, can be so constructed that they will have a controllable and predictable response to high temperature radiation damage with a minimal shrinkage in the one critical direction (the vertical direction in this instance). This result obtains when the highly anisotropic graphite crystallites in the bars or blocks are mutually oriented in a manner approaching that characteristic of a single crystal of natural or flake graphite. Such bars under exposure to high temperature radiation would suffer minimal shrinkage in the direction perpendicular to the planes of the graphite crystallites. By controlling the internal orientation of these graphite crystallites or coke or carbonaceous particles employed in the manufacture of these rods and combining this with proper placement of such internally oriented rods in the reactor, after said rods or blocks have been graphitized, the deleterious radiation effects from the uranium rods 75 are dispelled horizontally across a series of such rods or in a direction along the length of the rods rather than vertically, thereby minimizing downward slumping. The susceptibility of these core material bars to high temperature radiation damage in the one critical direction is thereby very greatly minimized with the result that the frequentness of reconstruction or repair of the reactor is greatly lessened.

This invention is directed toward the discovery and control of those conditions effectuating the best internal structure of such rods, best reactor placement of such rods, the formulation and processing for bringing about such controlled orientation and placement, and also with the discovery, design and construction of special extrusion apparatus which will mechanically assist in bringing about this orientation.

We have found that the core material rods best suited for use in neutronic reactors and as depicted in FIGURE 5 should essentially be comprised, when in their extruded "green" state, of carbonaceous particles in substantially platelet form, wherein said platelets, when extruded in the apparatus of this invention, form lamellae lengthwise of the rod. These lamellae are disposed in a plurality of superimposed planes a high percentage of which planes are substantially mutually parallel. This preferential orientation or alignment of the lamellae or platelets obtains in a "green" extruded bar, when after baking and graphitizing said "green" bar, the physical properties, e.g., Coefficient of Thermal Expansion, Resistivity, etc. measured along three mutually perpendicular axes corresponding to the two edges and length of a bar of rectangular cross section exhibit approximately the same type of anisotropy characteristic of a single crystal of graphite. In other words, the magnitude of any given property measured along the axes of extrusion and in one direction, e.g., along the width perpendicular to the extrusion axis, will be substantially different from the magnitude of that same property measured in the direction (i.e., along the height) mutually perpendicular to the other two axes. These effects and their meaning will be made clearer by reference to the examples which follow.

We have also found that all of the rods in the neutronic reactor should be so placed that these lamellar planes are substantially horizontal throughout the entire reactor. This can be better understood by referring to said FIGURE 5 wherein a perspective view of a portion of a typical neutronic reactor is shown and wherein bars or rods 20 in their extruded "green," viz. formed, but unbaked condition having lamellae 22 disposed in a plurality of superimposed parallel planes are shown, and also wherein all of the rods of the reactor are properly placed with respect to each other. The cylindrically shaped holes 21 are centrally located within each of the rods or bars to accommodate fuel elements. (It is to be understood that the rods will be graphitized before their placement in the reactor with the "green" state orientation above described for illustrative purposes preserved.) When these conditions prevail, the CTE (coefficient of thermal expansion) and resistivity of the rods when graphitized are considerably greater in the X direction than they are in the Y or Z directions. This results in the minimization of radiation damage in the X direction and the substantial reduction of downward slumping caused thereby when such graphitized rods or bars are used in the reactors. As previously stated, the elimination or minimization of damage caused in the horizontal or Z direction, or lengthwise of the rods or in the Y direction, is not nearly so critical to the proper continued functioning of the reactor as is the minimization of damage in the vertical or X direction. This is because the base of the reactor remains substantially firm and mechanically sound even with damage in these directions, whereas slumping in the X direction soon creates mechanical inoperability and damage throughout the entire reactor.

We have also discovered extrusion apparatus which is ideally equipped or constructed to bring about the production of such bars or rods having the orientation properties described, such apparatus and modifications thereof being shown in FIGURES 1 through 4.

FIGURE 1 is a sectional view of the extrusion device taken on the line 1—1 of FIGURE 2.

FIGURE 2 is a vertical sectional view of the extrusion device, taken on the line 2—2 of FIGURE 1.

FIGURE 3 is a plan sectional of the device taken on the line 3—3 of FIGURE 2.

FIGURE 4 is a fragmentary vertical sectional view of the device in a modified form.

Figure 5:
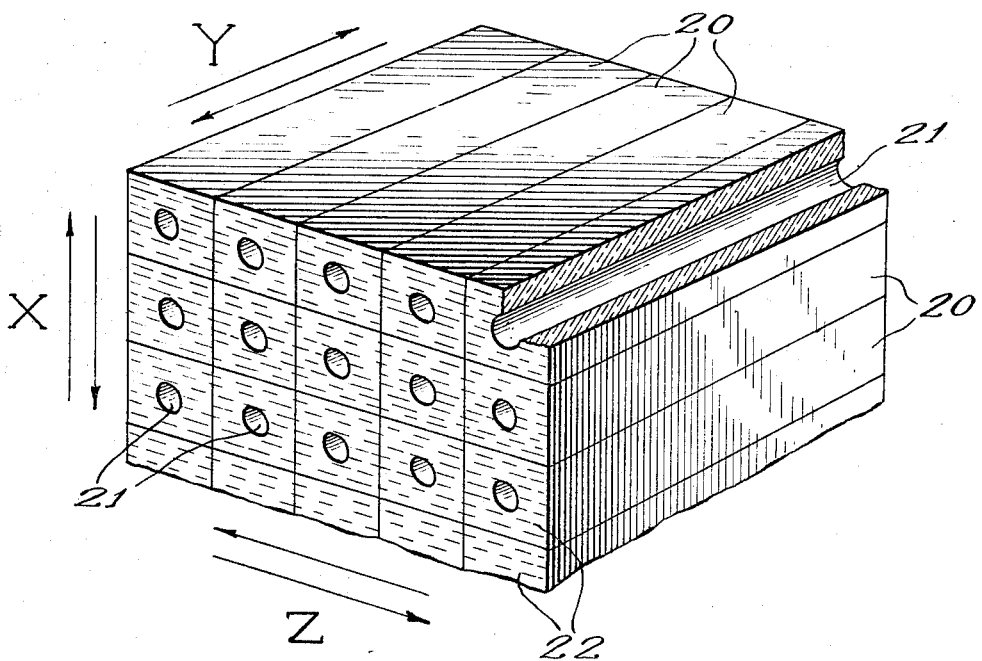

The apparatus in its most generally used form is comprised of three separate, differently shaped sections. These include a cylindrical extrusion chamber 1, a transition section 2, and a final forming section 3. The transition section has a circular inlet 4 and a substantially rectangular outlet 5. As is best illustrated by FIGURES 1 and 2, one of the dimensions or the height of said rectangular outlet 5 is substantially less than the diameter of the circular inlet 4. The width or breadth or the other dimension of rectangular outlet 5, on the other hand, is at least approximately equal to the diameter of the inlet and preferably is substantially greater than the diameter of circular inlet 4. FIGURE 2 shows the reduction which takes place in the transition section while FIGURE 3 shows the preferred enlargement. The transition section 2 is so designed and constructed as to smoothly and gradually change the cross section of the mixture being extruded from circular to substantially rectangular, and to bring the material being extruded to one of the final dimensions desired for the products in their "green" state. As a consequence of this, it is preferred that the cross-sectional area of the mass as it proceeds through this section be relatively constant, although this is not absolutely essential for the attainment of bodies having improved properties. This transition or second section 2 leads into a final forming or third section 3, the substantially rectangular inlet of which is the same as (and therefore has the dimensions of) the substantially rectangular outlet of the second or transition section. The final forming or third section also has a substantially rectangular outlet 6, the breadth of which is substantially the same as or equal to the breadth of the inlet, but the other dimension of which, viz. height, is substantially less than its corresponding dimension at the inlet. This one substantially equal dimension of the inlet and outlet of the third or final forming section is due to the fact that the third or final forming section possesses two substantially parallel walls 7 and 8 so that one of the dimensions of the mass being extruded remains substantially constant as it passes therethrough. The final forming or third section 3 also possesses two converging walls 9 and 10 which compress the extrudable carbonaceous mixture, which will be described in more detail hereinafter, as it passes therebetween from the transition or second section 2. The converging walls 9 and 10 preferably merge with the walls of the transitional second section in a somewhat curving manner thereby minimizing or preventing any sharply angular areas. These converging walls are also generally curved in a manner whereby they define a continuously diminishing thickness of the material passing therebetween for a portion thereof, most generally by means of curved walls having continuously diminishing slope, after which these walls also become substantially parallel to each other.

In a specific and preferred form of the invention, a blade like vane 11 is provided near the entrance of the final forming or third section. Typically it extends between the parallel walls thereof and is perpendicular thereto and is approximately equidistant from the converging walls. The vane may also possess flanges by means of which it can be mounted in recesses or slots in the parallel walls of the apparatus. This vane 11 acts in conjunction with the curvature of the walls to assist in setting up shear forces in the mixture being extruded as it passes adjacent thereto and these forces tend to align the platelet-like particles of the carbonaceous mixture in planes parallel to the vane and to the axis of the apparatus and perpendicular to the parallel walls of the final forming or third section. These shear forces, in addition to the shear forces exerted upon and set up in the extrudable mixture as it passes through the transition section and as it is compressed in passing between the converging and parallel walls of the final forming or third section act together to form an extruded, "green," substantially rectangular cross-sectioned carbon rod wherein the platelet-like particles of the carbonaceous mixture in their extruded condition align to comprise lamellae, sometimes somewhat discontinuous in nature and at other times very nearly continuous, disposed in a plurality of superimposed planes a high percentage of which said lamellar planes are substantially mutually parallel and approximately perpendicular to the parallel walls of the third or final forming section. It should be understood that in many cases such a vane may not be required and that a device such as shown in FIGURE 1 is sufficient to obtain the required degree of orientation. Its need is also somewhat dependent on the amount of transition taking place in the transition or second section, and converging in the third section, etc.

It should also be appreciated that it is sometimes undesirable or unnecessary to employ a cylindrical extrusion chamber before the transition section. Such a case may occur where it is desired to employ means other than a cylindrical extrusion chamber to introduce the carbonaceous mass into the transition section. Because most of the desired orientation of the platelet-like particles is obtained by passing a proper extrudable mixture through the transition section and the final forming section even without employing a cylindrical first section, the combination of just these two sections is also claimed. The employment of such a first section, however, is preferred.

It should also be appreciated that more than one vane may be employed near the inlet of the final forming section or near the outlet of the transition section, depending somewhat on the size of the inlet of the final forming section. The employment of one or more vanes or blade-like members 11 and the particular placing of same and configuration of said members selected are all variables which may depend on the characteristics of the mix being extruded, temperatures and pressures employed, etc. They will of course be so chosen and designed as to obtain a maximum amount of orientation of the platelet-like particles, consistent with minimum counter pressures, good production rates and absence of any cleavage lines in the final, extruded but unbaked, "green" product.

In assembling the extrusion device of the present invention, the general procedure is to first assemble the final forming section which generally is formed from two correspondingly shaped members. The inlet end of the final forming section possesses a flange 15. The outlet end of the transition section also possesses a flange 16. Each of these flanges possess a number of corresponding holes 31 so that the flanges may be coupled to one another by any conventional means 32 such as nuts and bolts inserted therethrough, or threaded therein. Before the final forming and transition sections are coupled together however it is generally the practice to insert one or more vanes 11 having flanges into position in either the final forming section or in the transition section or partly in each. This is generally accomplished by sliding the flanges of said vane or vanes into slots in the walls of these sections. The entry portion 34 of the transition zone may typically possess external threads for engagement with internal threads in a cylindrical extrusion member 1 in those instances where a cylindrical extrusion member is employed. The general procedure, therefore, is to couple together corresponding sections of the final forming section, insert a vane or blade 11 in slots of the walls thereof, bolt flange 16 of transition section 2 to flange 15 of the final forming section 3 and then thread a cylindrical extrusion member 1 onto the entry end of the transition section.

Eye-bolts may be threaded into one or more of the sections in order to provide convenient means for lifting and locating the device. A circumferential heating chamber may surround the device such as at the entry portion of the final forming section in order to assist in keeping the extrudable carbonaceous mass at an optimum "fluidity" level for obtaining maximum particle orientation. Steam or other heat transfer means may be employed in this region. The cylindrical extrusion member and the transition seciton may also be provided with or surrounded by heating means in order to keep the mass being extruded at an optimum fluidity or viscosity.

Although the apparatus will generally be comprised of or assembled from two or three separate and distinct, differently shaped sections, it should be understood that this segmentation is or may not be strictly necessary and that such sections may exist in a singly fabricated apparatus having the different geometrically shaped chambers previously described.

Conventional extrusion techniques for making electrodes generally comprise passing a pitch-carbonaceous mixture from a mud chamber through a cylindrical extrusion die such as depicted as 1 in FIGURE 2. The cylindrical rods fabricated by such equipment are of course entirely unsuitable for use in nuclear reactors in the manner discussed previously. Not only do they not possess the proper geometrical cross-section, but also, even if a substantially square or rectangular cross-sectioned product were fashioned from such cylindrically shaped starting pieces, such as by machining off four arcs from the outer periphery, such a product would not possess the orientation properties required to minimize susceptibility to radiation damage in nuclear reacators. This is because the platelet-like particles would tend to align themselves in concentric ring fashion lengthwise of the products. Not only would such products lack the desired orientation but even if they possessed same, they would be unduly expensive and impractical because of the amount of machining that would be necessary to transform them into substantially square or rectangular cross-sectioned products and also because of loss of materials involved.

Direct extrusion into products such as rods or slabs which are square or rectangular in cross-section by means of conventional extrusion devices, not having the characteristics of the apparatus of this invention, also result in rods lacking the desired orientation. This is primarily because such devices are not characterized by a die having two substantially parallel walls, but instead utilize dies having two pair of converging opposite walls. Such devices also lack transition sections such as previously characterized. All of these factors prevent the obtainment of the desired preferential orientation such as is achieved when utilizing the apparatus of this invention.

Some of the apparatus combinations of this invention are, however, designed to utilize cylindrically shaped, conventional extrusion dies and further, without waste or machining, to transform carbonaceous mixtures which have been acted upon by such extrusion dies into carbon products having the desired rectangular cross-section and also the desired particle orientation. In order to accomplish the foregoing the apparatus combinations of the present invention which possess or utilize such cylindrically shaped sections also comprise or possess the "transition" section 2 which possesses a circular inlet 4 and a substantially rectangular outlet 5, the circular inlet having the same cross section as the outlet of the cylindrical extrusion member 1. The transition piece 2 is also preferably so designed that the extrudable mixture passing therethrough is caused to be substantially compressed in one dimension and allowed or caused to substantially expand in a dimension normal thereto. This relationship applies to the transition section shown in FIGURES 2 and 3. The cross-sectional area of the mixture being extruded at any given point in the transition section of these figures is relatively constant to insure that the simultaneous dimensional compression and expansion of the mixture as it is passing therethrough is relatively uniform.

When the transition piece or section in its preferred from has reached the final larger (and expanded) dimension desired for the mass being extruded, this section ends and the mixture being extruded enters into a final forming or third section whose larger dimension is substantially the same both at the entry and exit of said section, but whose smaller dimension at the entry is uniformly diminished by two walls which converge toward each other until they have compressed the mass being extruded into the desired substantially rectangular cross-sectional shape. This rectangular cross-sectioned extruded slab or block may then, if desired, be cut lengthwise into rods such as shown in FIGURE 5, which are substantially square in cross-section. Or the product may sometimes be used as is.

As shown in the drawings, the larger dimension of the mass being extruded remains constant in the final forming section while the smaller dimension is substantially further reduced therein, and a product, therefore, having the desired orientation is produced. Also, the outlet from the transition section and the inlet of the final forming section are of the same cross-section and are substantially rectangular shaped. One dimension of this rectangle is substantially greater than the other dimension. In the final forming section, the lesser dimension is reduced while the larger dimension remains constant. This larger dimension, as previously stated, is at least equal to the diameter of the circular inlet of the transition section and preferably enlarged thereover. These relationships are necessary in order to insure complete and uniform transition from a circular cross section to a rectangular cross section in the transition section, and the subsequent diminishing in proper amount of the smaller dimension of the extrudable mixture while its larger dimension remains constant as the extrudable mixture passes through the final forming or third section bringing about the desired preferential orientation of the platelet particles present in the carbonaceous mixture being extruded.

While we have been generally referring to transition sections having inlets or entrances which are circular in cross-section, it should be understood that the invention is not limited to this configuration except when a cylindrical extrusioin member 1 is employed in conjunction with the transition section. As previously stated, this is not always the case. The important feature of the transition section is that its outlet 5 shoud be substantially rectangular with one dimension substantially greater than its other. It is also necessary that only one dimension of the mass passing therethrough be reduced, and preferable that the other dimension be increased. But while the inlet of the transition section is preferably circular in cross-section, it may also be square, hexagonal, octagonal or of any regular cross-section such as may be inscribed by a circle. In other words, it can be of any regular geometrical shape which can be inscribed by a circle, ranging generally from a square to a circle itself. The diameter of an inscribed circle then always approximates the distance of a line drawn between opposite sides and through the center of said inlet.

The following examples are set forth in order to more fully describe the invention.

*Example 1*

An extrudable carbonaceous mass was prepared from a mixture of approximately 37 parts of coal tar pitch binder and 100 parts of "needle" coke such as shown in U.S. Patent 2,775,549. The particles of needle coke were of such a size that at least 55% passed through a 200 mesh screen and substantially all passed through a 20 mesh screen. This extrudable mixture was mixed at a temperature of approximately 160° C., cooled to approximately 100° C., and then extruded through the apparatus shown in FIGURES 1–3. The platelet like carbonaceous particles of this mixture after their passage through the apparatus were orientated in lamellae disposed in a plurality of superimposed planes a high percentage of which planes were substantially mutually parallel and approximately perpendicular to the substantially parallel walls of the third or final forming section. The ratio of the height of the inlet of this final forming section to the height of the outlet of said section was about 2 to 1. In other words, the smaller dimension of the extrudable mass changed by this amount while the larger dimension remained substantially constant. The extruded green carbon product was substantially rectangular in cross-section and possessed the platelet orientation previously described. This "green" carbon product was baked and graphitized in accordance with conventional techniques and was then, except for lengthwise cutting and final machining and boring, ready for placement and use in neutronic reactors also as previously described.

*Example 2*

The procedure of Example 1 was repeated employing approximately 40 parts of pitch binder and 100 parts of "needle" coke of such a particle size that at least 55% passed through a 200 mesh screen and substantially all passed through a 20 mesh screen. This mixture was extruded through the apparatus shown in FIGURES 1–3. The "green" carbon product produced, when baked and graphitized, possessed a CTE ($1/°C. \times 10^7$) of 12.8 in the Z direction, 39.4 in the X direction and 10.7 in the Y direction, as these directions are indicated in FIGURE 5. It can be seen from this that the magnitude of the CTE along the axis of extrusion and along the width perpendicular to the extrusion axis are substantially different from the magnitude of the CTE measured along the X direction or the height of the rod, which is mutually perpendicular to the other two directions. The resistivity (ohm/in.$^3 \times 10^5$) of this product was 34 in the Z direction, 65 in the X direction and 29 in the Y direction.

*Example 3*

The procedure of Example 1 was repeated employing approximately 43 parts of pitch binder and 100 parts of "needle" coke of such a size that at least 55% passed through a 200 mesh screen and substantially all passed through a 20 mesh screen. The mixture was extruded through the cylindrical extrusion chamber and transition sections of FIGURES 1–3, but using the modified die shown in FIGURE 4. The "green" carbon product produced when baked and graphitized possessed a CTE in the Z direction of 16.2, a CTE of 53.5 in the X direction and a CTE of 11.2 in the Y direction. The resistivity of this product was 33 in the Z direction, 83 in the X direction and 33 in the Y direction.

The desired preferential orientation obtained in the foregoing examples is not achieved, nor is it achievable when using a standard type of extrusion apparatus.

It will be appreciated from the foregoing description and examples that a wide variation in the processing conditions, starting materials and apparatus features are possible and contemplated when carrying out the practices of this invention. For example, resins or suitable hydrocarbon binders may be employed as well as pitch. The amount of binder employed and the particle sizes and types of starting carbonaceous platelets may all be varied. Carbonaceous particles in substantially platelet form such as finely ground (preferably all at least finer than 20 mesh) "needle" coke shown in U.S. Patent 2,775,549, decomposed silicon carbide, natural graphite and kish and mixtures thereof are among those which may be employed as starting carbonaceous materials and mixed with a binder such as pitch and processed and extruded through the devices of the present invention to form products having the desired properties. The amount of pitch used when it is employed as a binder will generally vary from about 30 to about 45 parts per 100 parts of carbonaceous material. The temperatures and pressures employed may be varied. The use of a cylindrical extrusion chamber is optional and if it is used, it may have a variable length. The transition section may vary in its angle of slope and in its length as well as in other manners previously described. The size of the inlet of the final forming section may be varied greatly and the ratio of the dimension of the inlet of the final forming section which is compressed to its reduced dimension at the outlet may vary considerably, such as from about 2:1 to 5:1 with suitable modification in the contour of the final forming section. The employment of one or more vanes in conjunction with all of the foregoing variables and the possible varied locations of same all taken together make it possible to form products having the desired characteristics previously described and are contemplated as being embraced in the present invention. These variations, the selection of the desired starting materials, equipment employed, etc., are considered within the skill of one working in the art once the main features of this invention are before him. We therefore do not wish to be limited except as defined by the appended claims.

We claim:

1. An apparatus suitable for acting upon an extrudable material and causing preferential orientation therein while it is being extruded comprising in combination a forming zone consisting of a transition section having an inlet which is substantially inscribable by a circle and a substantially rectangular outlet one dimension of which is substantially less than the diameter of the inlet and the other dimension of which is substantially greater than the diameter of the inlet, and a final forming section having a substantially rectangular inlet whose dimensions are the same as the outlet of the transition section and a substantially rectangular outlet the larger dimension of which is substantially the same as and corresponds to the larger dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

2. An apparatus suitable for acting upon an extrudable material and causing preferential orientation therein while it is being extruded comprising in combination a forming zone consisting of a transition section having a circular inlet and a substantially rectangular outlet one dimension of which is substantially less than the diameter of the inlet and the other dimension of which is substantially greater than the diameter of the inlet, and a final forming section having a substantially rectangular inlet whose dimensions are the same as the outlet of the transition section and a substantially rectangular outlet the larger dimension of which is substantially the same as and corresponds to the larger dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

3. An apparatus suitable for acting upon an extrudable material and causing preferential orientation therein while it is being extruded comprising in combination a forming zone consisting of a cylindrically shaped extrusion section, a transition section having a circular inlet and a substantially rectangular outlet, one dimension of said rectangular outlet being substantially less than the diameter of the circular inlet and the other dimension of the rectangular outlet being substantially greater than the diameter of the circular inlet, and a final forming section having a substantially rectangular inlet whose dimensions are the same as the outlet of the transition section and a substantially rectangular outlet the larger dimension of which is substantially the same as and corresponds to the larger dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

4. An apparatus according to claim 1 having at least one bladelike vane near the entrance of the final forming section suitably positioned to assist in giving the orientation desired in the mass being extruded.

5. An apparatus suitable for acting upon an extrudable material and causing preferential orientation therein while it is being extruded comprising in combination a forming zone consisting of a cylindrically shaped extrusion section, a transition section having a circular inlet and a substantially rectangular outlet, the width of said rectangular outlet being substantially greater than the diameter of the circular inlet and the height of the rectangular outlet being substantially less than the diameter of the circular inlet, and a final forming section having a substantially rectangular inlet whose dimensions are the same as the outlet of the transition section and a substantially rectangular outlet whose width is substantially the same as the width of the inlet, and whose height is substantially less than the height of said inlet, said final forming section having two substantially parallel walls and two walls which converge for a portion of their length and which are adapted to compress a mass as it passes therethrough from the transition section.

6. An apparatus suitable for acting upon an extrudable material and causing preferential orientation therein while it is being extruded comprising in combination a forming zone consisting of a transition section having an inlet which is substantially inscribable by a circle and a substantially rectangular outlet one dimension of which is substantially less than the diameter of the inlet and the other dimension of which is at least equal to the diameter of the inlet, and a final forming section having a substantially rectangular inlet whose dimensions are the same as the outlet of the transition section and a substantially rectangular outlet the larger dimension of which is substantially the same as and corresponds to the larger dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

7. An apparatus suitable for acting upon an extrudable material and causing preferential orientation therein while it is being extruded comprising in combination a forming zone consisting of a transition section having a circular inlet and a substantially rectangular outlet one dimension of which is substantially less than the diameter of the inlet and the other dimension of which is at least equal to the diameter of the inlet, and a final forming section having a substantially rectangular inlet whose dimensions are the same as the outlet of the transition section and a substantially rectangular outlet the larger dimension of which is substantially the same as and corresponds to the large dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

8. An apparatus suitable for acting upon an extrudable material and causing preferential orientation therein while it is being extruded comprising in combination a forming zone consisting of a cylindrically shaped extrusion section, a transition section having a circular inlet and a substantially rectangular outlet, one dimension of said rectangular outlet being substantially less than the diameter of the circular inlet and the other dimension of the rectangular outlet being at least equal to the diameter of the circular inlet, and a final forming section having a substantially rectangular inlet whose dimenions are the same as the outlet of the transition section and a substantially rectangular outlet the larger dimension of which is substantially the same as and corresponds to the larger dimension of the inlet, and the smaller dimension of which is substantially less than the smaller dimension of said inlet, said final forming section having two substantially parallel walls and two walls which converge for a portion of their length and which are adapted to compress a mass as it passes therethrough from the transition section.

9. An apparatus according to claim 6 having at least one bladelike vane near the entrance of the final forming section suitably positioned to assist in giving the orientation desired in the mass being extruded.

References Cited by the Examiner
UNITED STATES PATENTS

| | | | |
|---|---|---|---|
| Re. 25,570 | 5/1964 | Lemelson | 25—17 X |
| 1,245,898 | 11/1917 | Gates | 18—12 |
| 1,411,170 | 3/1922 | Kahr | 25—17 |
| 1,952,038 | 3/1934 | Fischer. | |
| 2,126,869 | 8/1938 | Burchenal et al. | |
| 2,168,288 | 8/1939 | Fischer | 18—12 X |
| 2,402,281 | 6/1946 | Green | 18—12 X |
| 2,572,677 | 10/1951 | Tench | 18—12 |
| 2,715,256 | 8/1955 | Siegrist | 18—12 X |
| 2,817,113 | 12/1957 | Fields | 18—12 X |

WILLAM J. STEPHENSON, *Primary Examiner.*

ROBERT F. WHITE, J. SPENCER OVERHOLSER,
*Examiners.*

J. A. FINLAYSON, Jr., L. S. SQUIRES,
*Assistant Examiners.*